United States Patent
Siddhanthi et al.

(10) Patent No.: US 11,421,572 B2
(45) Date of Patent: Aug. 23, 2022

(54) EXHAUST GAS AFTERTREATMENT SYSTEM WITH A SELECTIVE CATALYTIC REDUCTION CATALYST MEMBER UPSTREAM OF A PARTICULATE FILTER

(71) Applicant: Cummins Inc., Columbus, IN (US)

(72) Inventors: Rohan A. Siddhanthi, Columbus, IN (US); Neal W. Wallace, Hope, IN (US); Michael Haas, Columbus, IN (US); Michael J. Ruth, Franklin, IN (US); Krishna Pradeep Chilumukuru, Columbus, IN (US); Shirish S. Punde, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 17/128,474

(22) Filed: Dec. 21, 2020

(65) Prior Publication Data

US 2021/0215079 A1 Jul. 15, 2021

Related U.S. Application Data

(60) Provisional application No. 62/958,866, filed on Jan. 9, 2020.

(51) Int. Cl.
*F01N 3/02* (2006.01)
*F01N 3/10* (2006.01)
(Continued)

(52) U.S. Cl.
CPC ......... *F01N 3/2066* (2013.01); *B01D 53/944* (2013.01); *B01D 53/9418* (2013.01);
(Continued)

(58) Field of Classification Search
CPC ........ F01N 3/208; F01N 3/2066; F01N 3/021; F01N 3/2803; F01N 3/32; F01N 3/105;
(Continued)

(56) References Cited

U.S. PATENT DOCUMENTS 6,823,663 B2   11/2004 Hammerle et al.
7,703,276 B2 *  4/2010 Ueno ................... F01N 11/002
                                                   60/286

(Continued)

*Primary Examiner* — Audrey B. Walter
*Assistant Examiner* — Dapinder Singh
(74) *Attorney, Agent, or Firm* — Foley & Lardner LLP

(57) ABSTRACT

An exhaust gas aftertreatment system for an internal combustion engine includes an inlet conduit, a reductant decomposition chamber, a first selective catalytic reduction (SCR) catalyst member, a second SCR catalyst member, a mixing chamber, a particulate filter, a reductant delivery system, and a hydrocarbon delivery system. The inlet conduit is configured to receive exhaust gas from the internal combustion engine. The reductant decomposition chamber is fluidly coupled to the inlet conduit and configured to receive the exhaust gas from the inlet conduit. The first SCR catalyst member is fluidly coupled to the reductant decomposition chamber and configured to receive the exhaust gas from the reductant decomposition chamber. The second SCR catalyst member is fluidly coupled to the first SCR catalyst member and is configured to receive the exhaust gas from the first SCR catalyst member.

20 Claims, 1 Drawing Sheet

(51) Int. Cl.
*F01N 3/20* (2006.01)
*B01D 53/94* (2006.01)
*F01N 3/28* (2006.01)
*F01N 3/021* (2006.01)
*F01N 3/32* (2006.01)

(52) U.S. Cl.
CPC ..... *B01D 53/9431* (2013.01); *B01D 53/9436* (2013.01); *B01D 53/9472* (2013.01); *B01D 53/9477* (2013.01); *F01N 3/021* (2013.01); *F01N 3/105* (2013.01); *F01N 3/2803* (2013.01); *F01N 3/2892* (2013.01); *F01N 3/32* (2013.01); *B01D 2255/20723* (2013.01); *B01D 2255/20738* (2013.01); *B01D 2255/20761* (2013.01); *B01D 2255/903* (2013.01); *B01D 2255/904* (2013.01); *B01D 2255/915* (2013.01); *F01N 2370/02* (2013.01); *F01N 2610/02* (2013.01); *F01N 2610/03* (2013.01); *F01N 2610/1453* (2013.01)

(58) Field of Classification Search
CPC .......... F01N 3/2892; F01N 2610/1453; F01N 2610/02; F01N 2610/03; F01N 2370/02; F01N 2510/068; F01N 2570/18; B01D 53/9418; B01D 53/9431; B01D 53/9436; B01D 53/944; B01D 53/9477; B01D 53/9472; B01D 2255/20723; B01D 2255/20761; B01D 2255/20738; B01D 2255/915; B01D 2255/904; B01D 2255/903; Y02T 10/12
See application file for complete search history.

(56) References Cited

U.S. PATENT DOCUMENTS

| | | | |
|---|---|---|---|
| 7,799,289 B2 | 9/2010 | Robel | |
| 8,205,279 B2 | 6/2012 | Devinat et al. | |
| 8,505,279 B2 | 8/2013 | Mital | |
| 8,555,617 B2 | 10/2013 | Mital | |
| 8,635,855 B2 | 1/2014 | Mital et al. | |
| 8,904,760 B2 | 12/2014 | Mital | |
| 9,528,413 B2 | 12/2016 | Katare et al. | |
| 10,927,740 B2 * | 2/2021 | Dou | B01D 53/9495 |
| 2006/0101810 A1 * | 5/2006 | Angelo | F01N 3/2066 60/286 |
| 2007/0012032 A1 * | 1/2007 | Hu | F01N 3/0842 60/286 |
| 2009/0205322 A1 | 8/2009 | Braun et al. | |
| 2010/0077739 A1 * | 4/2010 | Rodman | F01N 3/2066 60/301 |
| 2010/0192545 A1 * | 8/2010 | Schmieg | F01N 3/208 60/286 |
| 2011/0283680 A1 * | 11/2011 | Gekas | F01N 9/002 60/274 |
| 2013/0111886 A1 * | 5/2013 | Gonze | F01N 3/2033 60/286 |
| 2018/0045097 A1 * | 2/2018 | Tang | B01J 29/76 |

* cited by examiner

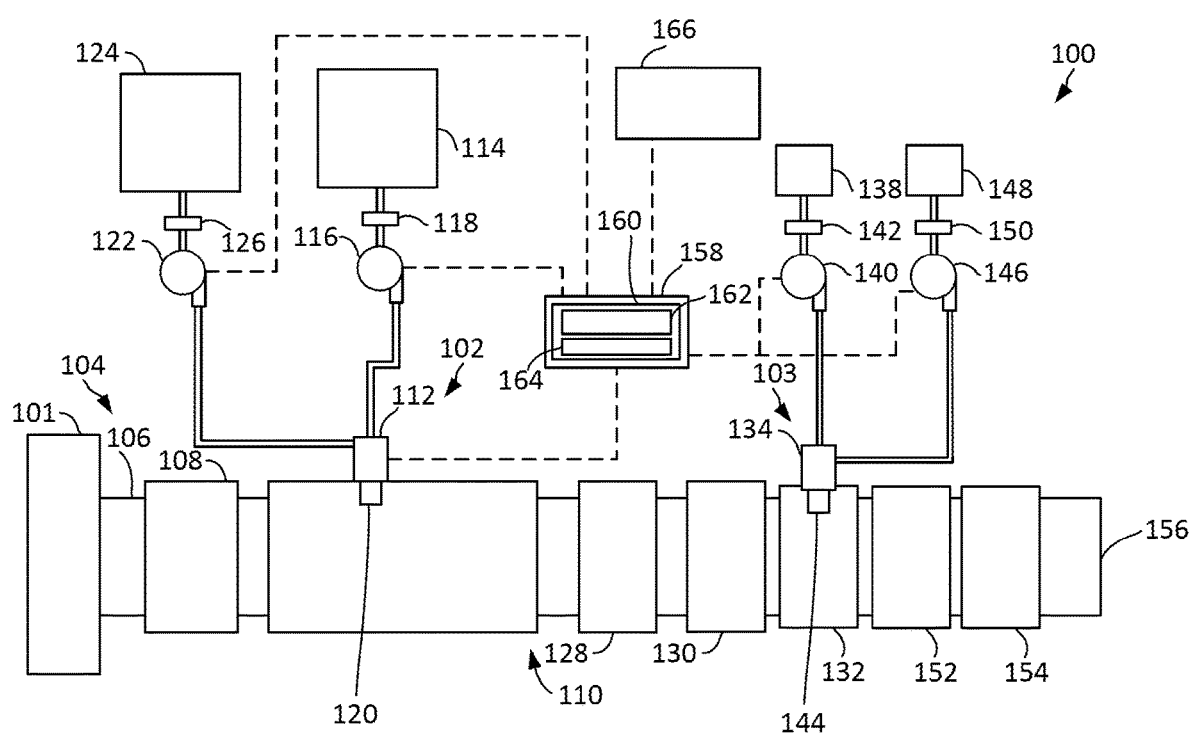

EXHAUST GAS AFTERTREATMENT SYSTEM WITH A SELECTIVE CATALYTIC REDUCTION CATALYST MEMBER UPSTREAM OF A PARTICULATE FILTER

CROSS-REFERENCE TO RELATED PATENT APPLICATION

The present application claims priority to U.S. Provisional Patent Application No. 62/958,866, entitled "Exhaust Gas Aftertreatment System with a Selective Catalytic Reduction Catalyst Member Upstream of a Particulate Filter" and filed Jan. 9, 2020, the contents of which are incorporated herein by reference.

TECHNICAL FIELD

The present application relates generally to an exhaust gas aftertreatment system for an internal combustion engine.

BACKGROUND

For internal combustion engines, such as diesel engines, nitrogen oxide ($NO_x$) compounds may be emitted in exhaust gas. It may be desirable to reduce $NO_x$ emissions to comply with environmental regulations, for example. To reduce $NO_x$ emissions, a reductant may be dosed into the exhaust by a dosing system and within an exhaust gas aftertreatment system. The reductant facilitates conversion of a portion of the exhaust gas into non-$NO_x$ emissions, such as nitrogen ($N_2$), carbon dioxide ($CO_2$), and water ($H_2O$), thereby reducing $NO_x$ emissions.

SUMMARY

In one embodiment, an exhaust gas aftertreatment system for an internal combustion engine includes an inlet conduit, a reductant decomposition chamber, a first selective catalytic reduction (SCR) catalyst member, a second SCR catalyst member, a mixing chamber, a particulate filter, a reductant delivery system, and a hydrocarbon delivery system. The inlet conduit is configured to receive exhaust gas from the internal combustion engine. The reductant decomposition chamber is fluidly coupled to the inlet conduit and configured to receive the exhaust gas from the inlet conduit. The first SCR catalyst member is fluidly coupled to the reductant decomposition chamber and configured to receive the exhaust gas from the reductant decomposition chamber. The second SCR catalyst member is fluidly coupled to the first SCR catalyst member and is configured to receive the exhaust gas from the first SCR catalyst member. The mixing chamber is fluidly coupled to the second SCR catalyst member and configured to receive the exhaust gas from the second SCR catalyst member. The particulate filter is fluidly coupled to the mixing chamber and configured to receive the exhaust gas from the mixing chamber. The reductant delivery system includes a reductant dosing module that is coupled to the reductant decomposition chamber and configured to provide reductant into the reductant decomposition chamber. The hydrocarbon fluid delivery system includes a hydrocarbon fluid dosing module that is coupled to the mixing chamber and configured to provide hydrocarbon fluid into the mixing chamber.

In another embodiment, an exhaust gas aftertreatment system includes a first oxidation catalyst member, a reductant decomposition chamber, a first SCR catalyst member, an exhaust gas conduit, a second SCR catalyst member, and a reductant delivery system. The first oxidation catalyst member is configured to receive an exhaust gas. The reductant decomposition chamber is fluidly coupled to the first oxidation catalyst member and configured to receive the exhaust gas from the first oxidation catalyst member. The first SCR catalyst member is fluidly coupled to the reductant decomposition chamber and configured to receive the exhaust gas from the reductant decomposition chamber. The first SCR catalyst member includes at least one of a copper catalyst member, an iron catalyst member, or a vanadia catalyst member. The exhaust gas conduit is fluidly coupled to the first SCR catalyst member and configured to receive the exhaust gas from the first SCR catalyst member. The second SCR catalyst member is fluidly coupled to the exhaust gas conduit and configured to receive the exhaust gas from the exhaust gas conduit, the second SCR catalyst member comprising at least one of an ammonia slip catalyst (ASC) catalyst member or an ASC zone-coating. The reductant delivery system includes a reductant dosing module that is coupled to the reductant decomposition chamber and configured to provide reductant into the reductant decomposition chamber. The exhaust gas conduit separates the second SCR catalyst member from the first SCR catalyst member.

In yet another embodiment, an exhaust gas aftertreatment system includes a first oxidation catalyst member, a first SCR catalyst member, a second SCR catalyst member, a mixing chamber, a second oxidation catalyst member, a particulate filter, and a hydrocarbon fluid delivery system. The first oxidation catalyst member is configured to receive an exhaust gas. The first SCR catalyst member is fluidly coupled to the first oxidation catalyst member and configured to receive the exhaust gas from the first oxidation catalyst member. The second SCR catalyst member is fluidly coupled to the first SCR catalyst member and configured to receive the exhaust gas from the first SCR catalyst member. The mixing chamber is fluidly coupled to the second SCR catalyst member and configured to receive the exhaust gas from the second SCR catalyst member. The second oxidation catalyst member is fluidly coupled to the mixing chamber and configured to receive the exhaust gas from the mixing chamber. The particulate filter is fluidly coupled to the second oxidation catalyst member and configured to receive the exhaust gas from the second oxidation catalyst member. The hydrocarbon fluid delivery system includes a hydrocarbon fluid dosing module that is coupled to the mixing chamber, the hydrocarbon fluid delivery system configured to provide hydrocarbon fluid into the mixing chamber.

BRIEF DESCRIPTION OF THE DRAWING

The details of one or more implementations are set forth in the accompanying drawing and the description below. Other features, aspects, and advantages of the disclosure will become apparent from the description, the drawing, and the claims, in which:

FIG. 1 is a block schematic diagram of an example exhaust gas aftertreatment system.

It will be recognized that FIG. 1 is a schematic representations for purposes of illustration. FIG. 1 is provided for the purpose of illustrating one or more implementations with the explicit understanding that FIG. 1 will not be used to limit the scope or the meaning of the claims.

DETAILED DESCRIPTION

Following below are more detailed descriptions of various concepts related to, and implementations of, methods, apparatuses, and for treating exhaust gas in an exhaust gas aftertreatment system that has a selective catalytic reduction catalyst member upstream of a particulate filter. The various concepts introduced above and discussed in greater detail below may be implemented in any of a number of ways, as the described concepts are not limited to any particular manner of implementation. Examples of specific implementations and applications are provided primarily for illustrative purposes.

I. Overview

Within an exhaust gas aftertreatment system, exhaust gas is provided with reductant to reduce $NO_x$ emissions. A mixture of the exhaust gas and the reductant may be passed through a catalyst. The catalyst may facilitate a chemical reaction thereby reducing levels of various emissions, such as $NO_x$ emissions, in the exhaust gas downstream of the catalyst. However, the catalyst may not be capable of desirably performing this chemical reaction until the catalyst attains a specific operating temperature. As a result, the catalyst may be unable to desirably reduce levels of emissions prior to the catalyst attaining the operating temperature.

In some situations, a total amount of emissions, as opposed to an amount of emissions per unit time, may be regulated. In such situations, it may be desirable to reduce emissions prior to the catalyst attaining the operating temperature because such emissions account for a significant portion of the total amount (which is regulated). For example, emissions could be reduced by decreasing the amount of time required for the catalyst to attain the operating temperature. Some systems utilize auxiliary heaters to heat the catalyst (e.g., using electricity, etc.) such that the catalyst attains the operating temperature more quickly than if the catalyst was heated by exhaust gas alone. However, these auxiliary heaters may be expensive and/or difficult to install. Furthermore, these auxiliary heaters may consume a significant amount of electricity, thereby decreasing efficiency of an internal combustion engine system utilizing the auxiliary heaters to heat a catalyst.

Implementations described herein are related to an exhaust gas aftertreatment system that does not include auxiliary heaters, but instead heats a first selective catalytic reduction (SCR) catalyst member with exhaust gas that has not yet passed through a particulate filter. Instead, the exhaust gas provided the first SCR catalyst member flows from an internal combustion engine, through a first oxidation catalyst member, and directly to the first SCR catalyst member. While implementations described herein may include a particulate filter, the particulate filter is located downstream of the first SCR catalyst member.

In contrast to the implementations described herein, other conventional systems intentionally flow exhaust gas through a particulate filter prior to flowing the exhaust gas through the SCR catalyst. The particulate filter has a thermal mass that absorbs heat that otherwise could be provided to the catalyst. As a result of placing the SCR catalyst member upstream of the particulate filter, the thermal mass of the particulate filter does not reduce heating provided to the SCR catalyst member in implementations described herein. Therefore, the SCR catalyst member in implementations described herein is capable of attaining an operating temperature more quickly than a catalyst in other systems which include a particulate filter upstream of the catalyst.

II. Example Exhaust Gas Aftertreatment System

FIG. 1 depicts an exhaust gas aftertreatment system 100 for treating exhaust gas produced by an internal combustion engine 101 (e.g., a diesel internal combustion engine, a locomotive internal combustion engine, bi-fuel internal combustion engine, etc.). The exhaust gas aftertreatment system 100 includes an example reductant delivery system 102 (e.g., dosing system, treatment system, etc.) for an exhaust gas conduit system 104. As is explained in more detail herein, the reductant delivery system 102 is configured to treat exhaust gas flowing within the exhaust gas conduit system 104 so as to reduce undesirable emissions within the exhaust gas. The exhaust gas aftertreatment system 100 also includes an example hydrocarbon fluid delivery system 103 (e.g., fuel dosing system, etc.) for an exhaust gas conduit system 104. As is explained in more detail herein, the hydrocarbon fluid delivery system 103 is configured to facilitate regeneration of various components of the exhaust gas aftertreatment system 100. By regenerating these components, the exhaust gas aftertreatment system 100 is capable of operating for prolonged periods of time between servicing (e.g., cleaning of components of the exhaust gas aftertreatment system 100, replacement of components of the exhaust gas aftertreatment system 100, etc.).

The exhaust gas conduit system 104 includes an inlet conduit 106 (e.g., manifold, pipe, etc.). The inlet conduit 106 is fluidly coupled to (e.g., in fluid communication with, etc.) the internal combustion engine 101 and receives the exhaust gas from the internal combustion engine 101. In various embodiments, the inlet conduit 106 is an exhaust manifold (e.g., header, etc.) mounted on the internal combustion engine 101 (e.g., fastened to the internal combustion engine 101, attached to the internal combustion engine 101 via a bracket, etc.).

The exhaust gas aftertreatment system 100 also includes a first oxidation catalyst member 108 (e.g., a diesel oxidation catalyst member (DOC)). The first oxidation catalyst member 108 is fluidly coupled to the inlet conduit 106 and receives the exhaust gas from the inlet conduit 106 (e.g., via a portion of the exhaust gas conduit system 104 extending between the first oxidation catalyst member 108 and the inlet conduit 106, etc.). The first oxidation catalyst member 108 oxidizes hydrocarbon fluids (e.g., fuel, lubricant, etc.) in the exhaust gas, carbon monoxide in the exhaust gas, and/or nitrogen oxide in the exhaust gas. In various embodiments, the first oxidation catalyst member 108 is mounted on the internal combustion engine 101 (e.g., via a bracket, etc.). After exiting the first oxidation catalyst member 108, oxidation of at least some of the hydrocarbon fluids in the exhaust gas, at least some of the carbon monoxide in the exhaust gas, and/or at least some of the nitrogen oxide in the exhaust gas has occurred.

The reductant delivery system 102 includes a reductant decomposition chamber 110 (e.g., decomposition reactor, reactor pipe, decomposition tube, reactor tube, reductant mixer, etc.). The reductant decomposition chamber 110 is fluidly coupled to the first oxidation catalyst member 108 and receives the exhaust gas from the first oxidation catalyst member 108. (e.g., via a portion of the exhaust gas conduit system 104 extending between the reductant decomposition chamber 110 and the first oxidation catalyst member 108, etc.). The reductant decomposition chamber 110 is configured to mix the exhaust gas with a reductant. The reductant may be, for example, urea, diesel exhaust fluid (DEF), Adblue®, a urea water solution (UWS), an aqueous urea solution (e.g., AUS32, etc.), and other similar fluids. As a result, the reductant decomposition chamber 110 is configured to provide a mixture of the exhaust gas and the reductant to the exhaust gas conduit system 104.

The reductant delivery system 102 also includes a reductant dosing module 112 (e.g., doser, etc.). The reductant dosing module 112 is configured to dose the reductant into the reductant decomposition chamber 110. The reductant dosing module 112 may include an insulator (e.g., thermal insulator, vibrational insulator, etc.) interposed between a portion of the reductant dosing module 112 and a portion of the reductant decomposition chamber 110 on which the reductant dosing module 112 is mounted.

The reductant dosing module 112 is fluidly coupled to a reductant source 114. The reductant dosing module 112 is configured to receive the reductant from the reductant source 114. The reductant source 114 may include multiple reductant sources 114. The reductant source 114 may be, for example, a diesel exhaust fluid tank containing Adblue®. A reductant pump 116 (e.g., supply unit, etc.) may be used to pressurize the reductant received from the reductant source 114 for delivery to the reductant dosing module 112. In some embodiments, the reductant pump 116 is pressure controlled (e.g., controlled to obtain a target pressure, etc.). The reductant pump 116 may receive the reductant from the reductant source 114 via a reductant filter 118. The reductant filter 118 filters (e.g., strains, etc.) the reductant prior to the reductant being provided to internal components (e.g., pistons, vanes, etc.) of the reductant pump 116. For example, the reductant filter 118 may inhibit or prevent the transmission of solids (e.g., solidified reductant, contaminants, etc.) to the internal components of the reductant pump 116. In this way, the reductant filter 118 may facilitate prolonged desirable operation of the reductant pump 116. In some embodiments, the reductant pump 116 is coupled to (e.g., attached to, fixed to, welded to, integrated with, etc.) a chassis of a vehicle associated with the exhaust gas aftertreatment system 100.

The reductant dosing module 112 includes at least one reductant injector 120. Each reductant injector 120 is configured to dose (e.g., inject, provide, etc.) the reductant into the exhaust gas (e.g., within the reductant decomposition chamber 110, etc.).

In some embodiments, the reductant delivery system 102 also includes an air pump 122. In these embodiments, the air pump 122 draws air from an air source 124 (e.g., air intake, etc.) and through an air filter 126 disposed upstream of the air pump 122. Additionally, the air pump 122 provides the air to the reductant dosing module 112. In these embodiments, the reductant dosing module 112 is configured to mix the air and the reductant into an air-reductant mixture and to dose the air-reductant mixture into the reductant decomposition chamber 110. In other embodiments, the reductant delivery system 102 does not include the air pump 122 or the air source 124. In such embodiments, the reductant dosing module 112 is not configured to mix the reductant with air and is instead configured to dose only reductant into the reductant decomposition chamber 110.

The reductant decomposition chamber 110 may also include a mixer (e.g., swirl mixer, Venturi mixer, plate mixer, etc.). The mixer is configured to increase mixing of the exhaust gas and the reductant. By increasing mixing of the exhaust gas and the reductant, a distribution of the reductant within the exhaust gas may become increasingly uniform. As a result of increasing this uniformity, an ability of the exhaust gas aftertreatment system 100 to reduce $NO_x$ emissions may be increased.

In various embodiments, operation of the reductant delivery system 102 is controlled based on a temperature of the exhaust gas in the inlet conduit 106. For example, if the temperature of the exhaust gas in the inlet conduit 106 increases, the reductant delivery system 102 may be caused to provide additional reductant to the exhaust gas within the reductant decomposition chamber 110.

The exhaust gas aftertreatment system 100 also includes a first selective catalytic reduction (SCR) catalyst member 128. The first SCR catalyst member 128 is fluidly coupled to the reductant decomposition chamber 110 and receives the exhaust gas and the reductant from the reductant decomposition chamber 110 (e.g., via a portion of the exhaust gas conduit system 104 extending between the first SCR catalyst member 128 and the reductant decomposition chamber 110, etc.). In various embodiments, the first SCR catalyst member 128 is a copper catalyst member, an iron catalyst member, a vanadia catalyst member, a zone-coated catalyst member (e.g., a catalyst member where a first zone is coated with a first material, a second zone is coated with a second material, etc.), or a low nitrous oxide ($N_2O$) producing catalyst member.

The first SCR catalyst member 128 is configured to assist in the reduction of $NO_x$ emissions by accelerating a $NO_x$ reduction process between the reductant and the $NO_x$ of the exhaust gas into diatomic nitrogen, water, and/or carbon dioxide. When the first SCR catalyst member 128 is at an operating temperature, the first SCR catalyst member 128 is configured to cause at least some of the reductant droplets undergo the processes of evaporation, thermolysis, and hydrolysis to form non-$NO_x$ emissions (e.g., gaseous ammonia, etc.), thereby reducing $NO_x$ emissions. In this way, the first SCR catalyst member 128 cooperates with the reductant decomposition chamber 110 to reduce $NO_x$ emissions in the exhaust gas downstream of the first SCR catalyst member 128.

When the first SCR catalyst member 128 is not at the operating temperature (e.g., when the internal combustion engine 101 is first started, when the internal combustion engine 101 is warming up, etc.), the first SCR catalyst member 128 may not cause at least some of the reductant droplets to undergo the processes of evaporation, thermolysis, and hydrolysis. As a result, the $NO_x$ reduction process may not be desirably accelerated by the first SCR catalyst member 128 until after the first SCR catalyst member 128 attains the operating temperature.

By being located downstream of only the first oxidation catalyst member 108 and the reductant decomposition chamber 110, and not downstream of a particulate filter, the first oxidation catalyst member 108 may be heated by the exhaust gas relatively quickly. In systems where a catalyst is positioned downstream of a particulate filter, a thermal mass of the particulate filter functions to resist heating of the catalyst. Unlike such conventional systems, the exhaust gas aftertreatment system 100 does not have a particulate filter upstream of the first SCR catalyst member 128. Therefore, heating of the first SCR catalyst member 128 is not resisted by a thermal mass of a particulate filter. As a result, the first SCR catalyst member 128 may attain the operating temperature more quickly than other catalysts which are downstream of particulate filters. This may enable the first SCR catalyst member 128 to accelerate the $NO_x$ reduction process after a shorter period of time than other catalysts which are downstream of particulate filters. Therefore, the exhaust gas aftertreatment system 100 may reduce $NO_x$ emissions more than other systems which have a catalyst that is downstream of a particulate filter.

In various embodiments, operation of the first SCR catalyst member 128 is controlled based on a temperature of the exhaust gas in the inlet conduit 106. For example, if the temperature of the exhaust gas in the inlet conduit 106 increases, the first SCR catalyst member 128 may be caused to increasingly accelerate the $NO_x$ reduction process.

The exhaust gas aftertreatment system 100 also includes a second SCR catalyst member 130. The second SCR catalyst member 130 is fluidly coupled to the first SCR catalyst member 128 and receives the exhaust gas from the first SCR catalyst member 128. The exhaust gas received by the second SCR catalyst member 130 may include $NO_x$ emissions, undesirable byproducts of the processes performed within the first SCR catalyst member 128, and/or non-$NO_x$ emissions. As is explained in more detail herein, the second SCR catalyst member 130 may function to reduce $NO_x$ emissions and/or reduce the byproducts (e.g., ammonia, etc.) of the processes performed within the first SCR catalyst member 128.

In various embodiments, the second SCR catalyst member 130 is configured to assist in the reduction of $NO_x$ emissions by further accelerating the $NO_x$ reduction process between the reductant and the $NO_x$ of the exhaust gas into diatomic nitrogen, water, and/or carbon dioxide. In these embodiments, the second SCR catalyst member 130 is configured to cause the reductant droplets undergo the processes of evaporation, thermolysis, and hydrolysis to form non-$NO_x$ emissions (e.g., gaseous ammonia, etc.). In this way, the second SCR catalyst member 130 cooperates with the reductant decomposition chamber 110 and the first SCR catalyst member 128 to reduce $NO_x$ emissions in the exhaust gas downstream of the second SCR catalyst member 130.

In various embodiments, the second SCR catalyst member 130 is an ammonia slip catalyst (ASC) member or an ASC zone-coated catalyst member. In these embodiments, the second SCR catalyst member 130 is configured to assist in the reduction of the byproducts (e.g., ammonia, etc.) of the processes performed within the first SCR catalyst member 128. Specifically, the first SCR catalyst member 128 may produce excess ammonia that slips into the exhaust gas downstream of the first SCR catalyst member 128. By reducing this ammonia, the second SCR catalyst member 130 may function to ensure that the exhaust gas downstream of the second SCR catalyst member 130 does not contain an undesirable amount of ammonia. In this way, the second SCR catalyst member 130 provides an advantage over other systems which do not reduce passage of ammonia to downstream components (e.g., filters, oxidizing catalysts, etc.), as these other systems may create NOR emissions when the ammonia contacts surfaces (e.g., platinum surfaces, palladium surfaces, etc.) of these downstream components.

In various embodiments, a conduit is coupled to the first SCR catalyst member 128 and the second SCR catalyst member 130. A sensor may be coupled to the conduit such that a parameter (e.g., temperature, amount of NOR, amount of ammonia ($NH_3$), etc.) of the exhaust gas within the conduit can be determined.

In various embodiments where the second SCR catalyst member 130 includes an ASC member or an ASC zone-coated catalyst member, a conduit is coupled to the second SCR catalyst member 130 upstream of the ASC member or an ASC zone-coated catalyst member and to the ASC member or an ASC zone-coated catalyst member. A sensor may be coupled to the conduit such that a parameter (e.g., temperature, amount of NOR, amount of ammonia ($NH_3$), etc.) of the exhaust gas within the conduit can be determined.

In various embodiments, operation of the second SCR catalyst member 130 is controlled based on a temperature of the exhaust gas in the inlet conduit 106. For example, if the temperature of the exhaust gas in the inlet conduit 106 increases, the second SCR catalyst member 130 may be caused to increasingly accelerate the NOR reduction process.

The hydrocarbon fluid delivery system 103 includes a mixing chamber 132 (e.g., hydrocarbon fluid decomposition chamber, hydrocarbon fluid mixer, etc.). The mixing chamber 132 is fluidly coupled to the second SCR catalyst member 130 and receives the exhaust gas from the second SCR catalyst member 130. The mixing chamber 132 is configured to mix the exhaust gas with a hydrocarbon fluid. The hydrocarbon fluid may be, for example, fuel (e.g., diesel fuel, etc.), diesel regeneration fluid, lubricant, and other similar fluids. As a result, the mixing chamber 132 is configured to provide a mixture of the exhaust gas and the hydrocarbon fluid to the exhaust gas conduit system 104.

The hydrocarbon fluid delivery system 103 also includes a hydrocarbon fluid dosing module 134 (e.g., doser, etc.). The hydrocarbon fluid dosing module 134 is configured to dose the hydrocarbon fluid into the mixing chamber 132. The hydrocarbon fluid dosing module 134 may include an insulator interposed between a portion of the hydrocarbon fluid dosing module 134 and a portion of the mixing chamber 132 on which the hydrocarbon fluid dosing module 134 is mounted.

The hydrocarbon fluid dosing module 134 is fluidly coupled to a hydrocarbon fluid source 138. The hydrocarbon fluid source 138 may include multiple hydrocarbon fluid sources 138. The hydrocarbon fluid source 138 may be, for example, a fuel tank, a diesel fuel tank, or a fuel reservoir. A hydrocarbon fluid pump 140 (e.g., supply unit, etc.) may be used to pressurize the hydrocarbon fluid from the hydrocarbon fluid source 138 for delivery to the hydrocarbon fluid dosing module 134. In some embodiments, the hydrocarbon fluid pump 140 is pressure controlled (e.g., controlled to obtain a target pressure, etc.). The hydrocarbon fluid pump 140 includes a hydrocarbon fluid filter 142. The hydrocarbon fluid filter 142 filters (e.g., strains, etc.) the hydrocarbon fluid prior to the hydrocarbon fluid being provided to internal components (e.g., pistons, vanes, etc.) of the hydrocarbon fluid pump 140. For example, the hydrocarbon fluid filter 142 may inhibit or prevent the transmission of solids (e.g., solidified hydrocarbon fluid, contaminants, etc.) to the internal components of the hydrocarbon fluid pump 140. In this way, the hydrocarbon fluid filter 142 may facilitate prolonged desirable operation of the hydrocarbon fluid pump 140. In some embodiments, the hydrocarbon fluid pump 140 is coupled to a chassis of a vehicle associated with the exhaust gas aftertreatment system 100.

The hydrocarbon fluid dosing module 134 includes at least one hydrocarbon fluid injector 144. Each hydrocarbon fluid injector 144 is configured to dose the hydrocarbon fluid into the exhaust gas (e.g., within the mixing chamber 132, etc.). In some embodiments, the hydrocarbon fluid delivery system 103 also includes a hydrocarbon fluid air pump 146. In these embodiments, the hydrocarbon fluid air pump 146 draws air from a hydrocarbon fluid air source 148 (e.g., air intake, etc.) and through a hydrocarbon fluid air filter 150 disposed upstream of the hydrocarbon fluid air pump 146. Additionally, the hydrocarbon fluid air pump 146 provides the air to the hydrocarbon fluid dosing module 134. In these embodiments, the hydrocarbon fluid dosing module 134 is configured to mix the air and the hydrocarbon fluid into an air-hydrocarbon fluid mixture and to provide the air-hydrocarbon fluid mixture into the mixing chamber 132. In other embodiments, the hydrocarbon fluid delivery system 103 does not include the hydrocarbon fluid air pump 146 or the hydrocarbon fluid air source 148. In such embodiments, the hydrocarbon fluid dosing module 134 is not configured to mix the hydrocarbon fluid with air.

In various embodiments, operation of the hydrocarbon fluid delivery system 103 is controlled based on a temperature of the exhaust gas in the inlet conduit 106. For example, if the temperature of the exhaust gas in the inlet conduit 106 increases, the hydrocarbon fluid delivery system 103 may be caused to provide additional hydrocarbon fluid to the exhaust gas within the mixing chamber 132.

The exhaust gas aftertreatment system 100 also includes a second oxidation catalyst member 152 (e.g., a DOC). The second oxidation catalyst member 152 is fluidly coupled to the mixing chamber 132 and receives the exhaust gas and the hydrocarbon fluid from the mixing chamber 132. The second oxidation catalyst member 152 oxidizes hydrocarbon fluids in the exhaust gas and/or carbon monoxide in the exhaust gas. For example, the second oxidation catalyst member 152 may oxidize the hydrocarbon fluid dosed into the exhaust gas by the hydrocarbon fluid dosing module 134. In various embodiments, the second oxidation catalyst member 152 is also capable of converting ammonia ($NH_3$) to nitrogen ($N_2$) at various operating temperatures of the second oxidation catalyst member 152.

By injecting the hydrocarbon fluid downstream of the first SCR catalyst member 128 and the second SCR catalyst member 130, aging (e.g., deterioration due to exposure to increased heat, etc.) of the first SCR catalyst member 128 and the second SCR catalyst member 130 due to the hydrocarbon fluid delivery system 103 is prevented. Additionally, $NO_x$ conversion efficiency of the first SCR catalyst member 128 and the second SCR catalyst member 130 while the hydrocarbon fluid is being provided by the hydrocarbon fluid delivery system 103 to the exhaust gas is greater than if the hydrocarbon fluid were injected upstream of the first SCR catalyst member 128 and/or the second SCR catalyst member 130 because the first SCR catalyst member 128 and/or the second SCR catalyst member 130 is at a lower temperature (e.g., by not being heated by combustion of the hydrocarbon fluid, etc.).

When the hydrocarbon fluid is oxidized, a temperature of the exhaust gas may increase. As a result of providing the exhaust gas within the mixing chamber 132 with the hydrocarbon fluid and subsequently oxidizing the hydrocarbon fluid within the second oxidation catalyst member 152, a temperature of the exhaust gas within the second oxidation catalyst member 152 may be increased. This increase in temperature may facilitate regeneration of the second oxidation catalyst member 152 and/or other components of the exhaust gas aftertreatment system 100 downstream of the second oxidation catalyst member 152. Regeneration may include combustion of deposits (e.g., scale, soot, etc.) within the second oxidation catalyst member 152 and/or other components of the exhaust gas aftertreatment system 100 downstream of the second oxidation catalyst member 152.

In various embodiments, operation of the second oxidation catalyst member 152 is controlled based on a temperature of the exhaust gas in the inlet conduit 106. For example, if the temperature of the exhaust gas in the inlet conduit 106 increases, the second oxidation catalyst member 152 may be caused to increasingly oxidize the hydrocarbon fluid.

The exhaust gas aftertreatment system 100 also includes a particulate filter (e.g., a diesel particulate filter (DPF)) 154. The particulate filter 154 is fluidly coupled to the second oxidation catalyst member 152 and receives the exhaust gas from the second oxidation catalyst member 152.

The particulate filter 154 is configured to remove particulate matter, such as soot, from the exhaust gas flowing in the exhaust gas conduit system 104. The particulate filter 154 provides the exhaust gas back to the exhaust gas conduit system 104 (e.g., after removing a portion of the particulate matter from the exhaust gas, etc.).

The particulate filter 154 receives the exhaust gas after the exhaust gas is provided with the hydrocarbon fluid in the mixing chamber 132 and at least partial oxidation of the hydrocarbon fluid within the second oxidation catalyst member 152 has occurred. This oxidation of the hydrocarbon fluid may cause a temperature of the exhaust gas flowing into the particulate filter 154 to be increased. As a result, a temperature of the exhaust gas flowing into the particulate filter 154 may be greater than a temperature of the exhaust gas entering the mixing chamber 132. This increase in temperature may facilitate regeneration of the particulate filter 154. This regeneration may include burning off particulate matter that is contained within the particulate filter 154 (e.g., particulate matter that has previously been removed from the exhaust gas and stored in the particulate filter 154, etc.). Regeneration of the particulate filter 154 may facilitate desirable operation of the particulate filter 154 for prolonged periods of time (e.g., because an amount of particulate matter contained within the particulate filter 154 may be decreased via regeneration prior to the amount exceeding a capacity of particulate matter for the particulate filter 154, etc.).

In various embodiments, operation of the particulate filter 154 is controlled based on a temperature of the exhaust gas in the inlet conduit 106. For example, if the temperature of the exhaust gas in the inlet conduit 106 increases, the particulate filter 154 may be caused to increasingly remove particulate matter from the exhaust gas flowing in the exhaust gas conduit system 104.

In various embodiments, the particulate filter 154 is also capable of converting ammonia ($NH_3$) to nitrogen ($N_2$) at various operating temperatures of the second oxidation catalyst member 152.

In various embodiments, the particulate filter 154 is also capable of converting $NO_x$ into nitrogen ($N_2$), carbon dioxide ($CO_2$), and water ($H_2O$) at various operating temperatures of the second oxidation catalyst member 152.

In various embodiments, operation of the hydrocarbon fluid delivery system 103 is controlled based on at least one of: a timer (e.g., comparing a timer to a threshold amount of time and then delivering hydrocarbon fluid when the timer reaches the threshold time, etc.), a pressure difference across the particulate filter 154 (e.g., delivering hydrocarbon fluid when a pressure difference across the particulate filter 154 exceeds a threshold pressure, etc.), a soot load in the particulate filter 154 (e.g., delivering hydrocarbon fluid when a soot load in the particulate filter 154 exceeds a threshold soot load, etc.), or delivering hydrocarbon fluid when a target amount of fuel is consumed by the internal combustion engine 101.

In various embodiments, operation of the hydrocarbon fluid delivery system 103 is controlled based on thermal management of at least one of the first oxidation catalyst member 108 or the second oxidation catalyst member 152. For example, when thermal management of the first oxidation catalyst member 108 is occurring, the hydrocarbon fluid delivery system 103 may be operated to delivery hydrocarbon fluid.

The exhaust gas conduit system 104 also includes an outlet conduit 156 (e.g., manifold, pipe, etc.). The outlet conduit 156 is fluidly coupled to the particulate filter 154 and receives the exhaust gas from the particulate filter 154. The outlet conduit 156 provides the exhaust gas to a tailpipe (e.g., for providing the exhaust gas to atmosphere, etc.).

In various embodiments, the exhaust gas aftertreatment system 100 is a single flow path arrangement and does not include multiple parallel flow paths. For example, the exhaust gas conduit system 104 does not include two parallel exhaust gas conduits extending between the first oxidation catalyst member 108 and the reductant decomposition chamber 110, between the reductant decomposition chamber 110 and the first SCR catalyst member 128, between the first SCR catalyst member 128 and the second SCR catalyst member 130, between the second SCR catalyst member 130 and the mixing chamber 132, between the mixing chamber 132 and the second oxidation catalyst member 152, and/or between the second oxidation catalyst member 152 and the particulate filter 154.

In various embodiments, the exhaust gas aftertreatment system 100 does not include any components between the outlet conduit 156 and the particulate filter 154. For example, the exhaust gas aftertreatment system 100 does not include an SCR catalyst member between the outlet conduit 156 and the particulate filter 154.

In various embodiments, the exhaust gas aftertreatment system 100 does not include a trap (e.g., $NO_x$ trap, water trap, etc.). Such traps may be a catalyst device that stores $NO_x$ emissions at a low temperature and then releases the $NO_x$ emissions at a high temperature. These traps may be very expensive and prone to irreversible poisoning during rich combustion conditions. While the exhaust gas aftertreatment system 100 does not include a trap, $NO_x$ emissions are still reduced as a result, in part, of the first SCR catalyst member 128 and the second SCR catalyst member 130 being upstream of the particulate filter 154. However, because the exhaust gas aftertreatment system 100 does not include a trap, the exhaust gas aftertreatment system 100 may be significantly less expensive than systems that include a trap. In other embodiments, the exhaust gas aftertreatment system 100 does include a trap.

In various embodiments, the first SCR catalyst member 128 and the second SCR catalyst member 130 are not hydrocarbon SCR catalysts (HC-SCRs). As a result, the exhaust gas aftertreatment system 100 may be less expensive than other systems that include an HC-SCR.

The reductant dosing module 112, the reductant pump 116, the hydrocarbon fluid dosing module 134, and the hydrocarbon fluid pump 140 are electrically or communicatively coupled to a controller 158. The controller 158 is configured to control the reductant dosing module 112 to dose the reductant into the reductant decomposition chamber 110. The controller 158 may also be configured to control the reductant pump 116 (e.g., to control an amount of the reductant that is dosed into the reductant decomposition chamber 110, etc.). Similarly, the controller 158 is configured to control the hydrocarbon fluid dosing module 134 to dose the hydrocarbon into the mixing chamber 132. The controller 158 may also be configured to control the hydrocarbon fluid pump 140 (e.g., to control an amount of the hydrocarbon fluid that is dosed into the mixing chamber 132, etc.).

The controller 158 includes a processing circuit 160. The processing circuit 160 includes a processor 162 and a memory 164. The processor 162 may include a microprocessor, an application-specific integrated circuit (ASIC), a field-programmable gate array (FPGA), etc., or combinations thereof. The memory 164 may include, but is not limited to, electronic, optical, magnetic, or any other storage or transmission device capable of providing a processor, ASIC, FPGA, etc. with program instructions. This memory 164 may include a memory chip, Electrically Erasable Programmable Read-Only Memory (EEPROM), Erasable Programmable Read Only Memory (EPROM), flash memory, or any other suitable memory from which the controller 158 can read instructions. The instructions may include code from any suitable programming language. The memory 164 may include various modules that include instructions which are configured to be implemented by the processor 162.

In various embodiments, the controller 158 is configured to communicate with a central controller 166 (e.g., engine control unit (ECU), engine control module (ECM), etc.) of an internal combustion engine having the exhaust gas aftertreatment system 100. In some embodiments, the central controller 166 and the controller 158 are integrated into a single controller.

In some embodiments, the central controller 166 is communicable with a display device (e.g., screen, monitor, touch screen, heads up display (HUD), indicator light, etc.). The display device may be configured to change state in response to receiving information from the central controller 166. For example, the display device may be configured to change between a static state (e.g., displaying a green light, displaying a "SYSTEM OK" message, etc.) and an alarm state (e.g., displaying a blinking red light, displaying a "SERVICE NEEDED" message, etc.) based on a communication from the central controller 166. By changing state, the display device may provide an indication to a user (e.g., operator, etc.) of a status (e.g., operation, in need of service, etc.) of the reductant delivery system 102 and/or the hydrocarbon fluid delivery system 103.

While the exhaust gas aftertreatment system 100 has been shown and described in the context of use with a diesel internal combustion engine, it is understood that the exhaust gas aftertreatment system 100 may be used with other internal combustion engines, such as gasoline internal combustion engines, hybrid internal combustion engines, propane internal combustion engines, and other similar internal combustion engines.

III. Construction of Example Embodiments

While this specification contains many specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the terms "substantially," "generally," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The term "coupled" and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, with the two components, or with the two components and any additional intermediate components being attached to one another.

The terms "fluidly coupled to" and the like, as used herein, mean the two components or objects have a pathway formed between the two components or objects in which a fluid, such as air, exhaust gas, liquid reductant, gaseous reductant, aqueous reductant, gaseous ammonia, etc., may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the various systems shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the disclosure, the scope being defined by the claims that follow. When the language "a portion" is used, the item can include a portion and/or the entire item unless specifically stated to the contrary.

Also, the term "or" is used, in the context of a list of elements, in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

Additionally, the use of ranges of values (e.g., W1 to W2, etc.) herein are inclusive of their maximum values and minimum values (e.g., W1 to W2 includes W1 and includes W2, etc.), unless otherwise indicated. Furthermore, a range of values (e.g., W1 to W2, etc.) does not necessarily require the inclusion of intermediate values within the range of values (e.g., W1 to W2 can include only W1 and W2, etc.), unless otherwise indicated.

What is claimed is:

1. An exhaust gas aftertreatment system comprising:
    an inlet conduit configured to receive exhaust gas from an internal combustion engine;
    a reductant decomposition chamber fluidly coupled to the inlet conduit and configured to receive the exhaust gas from the inlet conduit;
    a first selective catalytic reduction (SCR) catalyst member fluidly coupled to the reductant decomposition chamber and configured to receive the exhaust gas from the reductant decomposition chamber;
    a second SCR catalyst member directly fluidly coupled to the first SCR catalyst member and configured to receive the exhaust gas from the first SCR catalyst member;
    a mixing chamber fluidly coupled to the second SCR catalyst member and configured to receive the exhaust gas from the second SCR catalyst member;
    a particulate filter fluidly coupled to the mixing chamber and configured to receive the exhaust gas from the mixing chamber;
    a reductant delivery system comprising a reductant dosing module coupled to the reductant decomposition chamber and configured to provide reductant into the reductant decomposition chamber; and
    a hydrocarbon fluid delivery system comprising a hydrocarbon fluid dosing module coupled to the mixing chamber, the hydrocarbon fluid delivery system configured to provide hydrocarbon fluid into the mixing chamber.

2. The exhaust gas aftertreatment system of claim 1, wherein the second SCR catalyst member comprises at least one of an ammonia slip catalyst (ASC) member or an ASC zone-coating.

3. The exhaust gas aftertreatment system of claim 2, wherein the first SCR catalyst member comprises at least one of a copper catalyst member, an iron catalyst member, or a vanadia catalyst member.

4. The exhaust gas aftertreatment system of claim 1, further comprising a first oxidation catalyst member fluidly coupled to the inlet conduit and the reductant decomposition chamber, the first oxidation catalyst member configured to receive the exhaust gas from the inlet conduit and to provide the exhaust gas to the reductant decomposition chamber.

5. The exhaust gas aftertreatment system of claim 4, wherein the second SCR catalyst member comprises an ammonia slip catalyst member that is configured to facilitate a chemical reaction with ammonia in the exhaust gas within the second SCR catalyst member such that an amount of the ammonia included in the exhaust gas provided from the second SCR catalyst member is reduced.

6. The exhaust gas aftertreatment system of claim 4, further comprising a second oxidation catalyst member fluidly coupled to the mixing chamber and the particulate filter, the second oxidation catalyst member configured to receive the exhaust gas from the mixing chamber and provide the exhaust gas to the particulate filter.

7. The exhaust gas aftertreatment system of claim 6, wherein the second oxidation catalyst member is configured to convert ammonia to nitrogen.

8. The exhaust gas aftertreatment system of claim 1, further comprising an exhaust gas conduit coupled to the first SCR catalyst member and the second SCR catalyst member, the exhaust gas conduit providing for a separation between the first SCR catalyst member and the second SCR catalyst member.

9. The exhaust gas aftertreatment system of claim 1, wherein:
    the reductant delivery system further comprises:
        a reductant pump that is configured to receive the reductant from a reductant source; and
        an air pump that is configured to receive air from an air source; and
    the reductant dosing module is configured to receive the reductant from the reductant pump and the air from the air pump and provide the reductant and the air into the reductant decomposition chamber.

10. The exhaust gas aftertreatment system of claim 1, wherein:

the hydrocarbon fluid delivery system further comprises:
- a hydrocarbon fluid pump that is configured to receive the hydrocarbon fluid from a reductant source; and
- an hydrocarbon fluid air pump that is configured to receive air from a hydrocarbon fluid air source; and the hydrocarbon fluid dosing module is configured to receive the hydrocarbon fluid from the hydrocarbon fluid pump and the air from the hydrocarbon fluid air pump and provide the hydrocarbon fluid and the air into the mixing chamber.

11. An exhaust gas aftertreatment system comprising:
- a first oxidation catalyst member configured to receive an exhaust gas;
- a reductant decomposition chamber fluidly coupled to the first oxidation catalyst member and configured to receive the exhaust gas from the first oxidation catalyst member;
- a first selective catalytic reduction (SCR) catalyst member fluidly coupled to the reductant decomposition chamber and configured to receive the exhaust gas from the reductant decomposition chamber, the first SCR catalyst member comprising at least one of a copper catalyst member, an iron catalyst member, or a vanadia catalyst member;
- an exhaust gas conduit directly fluidly coupled to the first SCR catalyst member and configured to receive the exhaust gas from the first SCR catalyst member;
- a second SCR catalyst member directly fluidly coupled to the exhaust gas conduit and configured to receive the exhaust gas from the exhaust gas conduit, the second SCR catalyst member comprising at least one of an ammonia slip catalyst (ASC) member or an ASC zone-coating;
- a reductant delivery system comprising a reductant dosing module coupled to the reductant decomposition chamber and configured to provide reductant into the reductant decomposition chamber;
- a mixing chamber fluidly coupled to the second SCR catalyst member and configured to receive the exhaust gas from the second SCR catalyst member; and
- a hydrocarbon fluid delivery system comprising a hydrocarbon fluid dosing module coupled to the mixing chamber, the hydrocarbon fluid delivery system configured to provide hydrocarbon fluid into the mixing chamber;
- wherein the exhaust gas conduit separates the second SCR catalyst member from the first SCR catalyst member.

12. The exhaust gas aftertreatment system of claim 11, wherein the second SCR catalyst member is configured to facilitate a chemical reaction with ammonia in the exhaust gas within the second SCR catalyst member such that an amount of the ammonia included in the exhaust gas provided from the second SCR catalyst member is reduced.

13. The exhaust gas aftertreatment system of claim 11, further comprising a second oxidation catalyst member fluidly coupled to the second SCR catalyst member and configured to receive the exhaust gas from the second SCR catalyst member.

14. The exhaust gas aftertreatment system of claim 13, further comprising a particulate filter fluidly coupled to the second oxidation catalyst member and configured to receive the exhaust gas from the second oxidation catalyst member.

15. The exhaust gas aftertreatment system of claim 13, wherein the second oxidation catalyst member is configured to convert ammonia to nitrogen.

16. An exhaust gas aftertreatment system comprising:
- a first oxidation catalyst member configured to receive an exhaust gas;
- a first selective catalytic reduction (SCR) catalyst member fluidly coupled to the first oxidation catalyst member and configured to receive the exhaust gas from the first oxidation catalyst member;
- a second SCR catalyst member directly fluidly coupled to the first SCR catalyst member and configured to receive the exhaust gas from the first SCR catalyst member;
- a mixing chamber fluidly coupled to the second SCR catalyst member and configured to receive the exhaust gas from the second SCR catalyst member;
- a second oxidation catalyst member fluidly coupled to the mixing chamber and configured to receive the exhaust gas from the mixing chamber;
- a particulate filter fluidly coupled to the second oxidation catalyst member and configured to receive the exhaust gas from the second oxidation catalyst member; and
- a hydrocarbon fluid delivery system comprising a hydrocarbon fluid dosing module coupled to the mixing chamber, the hydrocarbon fluid delivery system configured to provide hydrocarbon fluid into the mixing chamber.

17. The exhaust gas aftertreatment system of claim 16, wherein the second SCR catalyst member comprises at least one of an ammonia slip catalyst (ASC) member or an ASC zone-coating.

18. The exhaust gas aftertreatment system of claim 17, wherein the first SCR catalyst member comprises at least one of a copper catalyst member, an iron catalyst member, or a vanadia catalyst member.

19. The exhaust gas aftertreatment system of claim 18, further comprising an exhaust gas conduit coupled to the first SCR catalyst member and the second SCR catalyst member, the exhaust gas conduit providing for a separation between the first SCR catalyst member and the second SCR catalyst member.

20. The exhaust gas aftertreatment system of claim 18, wherein:
the hydrocarbon fluid delivery system further comprises:
- a hydrocarbon fluid pump that is configured to receive the hydrocarbon fluid from a reductant source; and
- an hydrocarbon fluid air pump that is configured to receive air from a hydrocarbon fluid air source; and the hydrocarbon fluid dosing module is configured to receive the hydrocarbon fluid from the hydrocarbon fluid pump and the air from the hydrocarbon fluid air pump and provide the hydrocarbon fluid and the air into the mixing chamber.

* * * * *